United States Patent [19]

Dupont et al.

[11] Patent Number: 5,026,771

[45] Date of Patent: Jun. 25, 1991

[54] COATING COMPOSITIONS CONTAINING ETHYLENICALLY UNSATURATED CARBAMATES

[75] Inventors: William A. Dupont; Jerome W. Knapczyk, both of Wilbraham, Mass.

[73] Assignee: Monsanto Company, St. Louis, Mo.

[21] Appl. No.: 389,100

[22] Filed: Aug. 3, 1989

[51] Int. Cl.$^5$ .................. C08G 63/48; C08F 283/04; B32B 9/04; B32B 21/08

[52] U.S. Cl. ............................ 525/50; 525/452; 525/278; 525/454; 525/455; 525/456; 428/411.1; 428/524; 428/528

[58] Field of Search ............... 525/59, 452, 278, 454, 525/455, 456; 428/411.1, 524, 528

[56] References Cited

U.S. PATENT DOCUMENTS

| | | | |
|---|---|---|---|
| 3,749,592 | 7/1973 | Gaske et al. ........................ | 117/62 |
| 4,233,425 | 11/1980 | Tefertiller et al. ................ | 525/455 |
| 4,565,857 | 1/1986 | Grant .................................. | 527/301 |
| 4,609,706 | 9/1986 | Bode et al. ......................... | 527/7.4 |
| 4,654,233 | 3/1987 | Grant et al. ........................ | 427/379 |
| 4,670,308 | 6/1987 | Knapczyk ........................... | 427/350 |
| 4,965,313 | 10/1990 | Onda et al. ......................... | 525/59 |

FOREIGN PATENT DOCUMENTS 61-59621  3/1986  Japan ................................... 525/59

*Primary Examiner*—Melvyn I. Marquis
*Assistant Examiner*—W. R. H. Clark
*Attorney, Agent, or Firm*—R. Bruce Blance; William J. Farrington; Richard H. Shear

[57] ABSTRACT

Ethylenically unsaturated carbamates prepared by addition of unsaturated isocyanates to the hydroxy groups of polyvinyl acetals are formulated with allylic monomers and optionally unsaturated co-reactants selected from (meth)-acryloyl monomers and oligomers, maleates and fumarates to provide air-dry- and heat-curable coating compositions.

26 Claims, No Drawings

COATING COMPOSITIONS CONTAINING ETHYLENICALLY UNSATURATED CARBAMATES

This invention relates to protective coatings and in particular it relates to protective coatings of ethylenically unsaturated carbamates of polyvinyl acetals and their use in air-dry and forced dry curable coating compositions.

Conventional lacquers for wood furniture have utilized nitrocelluloses and cellulose esters as the resin component. These lacquers provide high gloss coats but are generally deficient in solvent resistance and scratch resistance. These deficiencies have been addressed by modifying the nitrocelluloses and cellulose esters with ethylenic unsaturation to allow the coatings to be applied to wood surfaces to form thermoplastic films which can be repaired, rubbed or buffed in conventional fashion to provide the quality finish required for saleability. Then by irradiation with ultraviolet light or electron beam, the coatings are converted to the solvent resistant, physically tough form which is preferred for enhanced durability.

Such unsaturated nitrocelluloses and cellulose esters have been formed by reaction with unsaturated isocyanates. However, they have been found deficient in many aspects. In some instances, a high level of unreacted isocyanate has posed a toxic hazard in the spray application of the lacquer. The resins are incompatible with many of the co-reactants which are used to enhance the degree of radiation cure and thus the choice of co-reactant is limited. They provide coatings which are often deficient in sandability and when the coatings are cured by irradiation, they are deficient in many instances in solvent resistance, stain resistance, hydrolysis resistance or impact resistance. They are limited in use to coating of wood surfaces and are generally undesirable on plastic surfaces since they impair the impact resistance of such substrates.

The present invention provides coating compositions comprising an ethylenically unsaturated carbamate of a polyvinyl acetal and a $\beta,\gamma$-ethylenically unsaturated co-reactant. Optionally, an $\alpha,\beta$-ethylenically unsaturated co-reactant can be included. The present invention further provides a method of protecting a substrate with a coating, comprising applying to the substrate a coating composition comprising an ethylenically unsaturated carbamate of a polyvinyl acetal and a 62 ,$\gamma$-ethylenically unsaturated co-reactant, and optionally an $\alpha,\beta$-ethylenically unsaturated co-reactant, drying the coating composition to remove solvent and curing the dried coating by air-dry or forced dry methods. The coating compositions therefore provide the advantage of curability without the need for radiation-induced crosslinking and consequently may be used to advantage on shaped subs&:rates since the cure method is not limited by the shadow effects of radiation cure. The dried coating may optionally be sanded, buffed or repaired prior to curing to provide a glossy, tough, durable, defect.-free finish. The ethylenically unsaturated carbamates supply the necessary degree of hardness to the coating composition to allow such sanding and buffing prior to curing and to enhance the hardness and durability of the cured coating.

As employed herein, the term "polyvinyl acetal" is intended to be used in a generic sense meaning the reaction product under acidic conditions of polyvinyl alcohol (i.e., an at least partially hydrolyzed polyvinyl ester) with at least one aldehyde and not in the specific sense of solely the reaction product of polyvinyl alcohol with acetaldehyde. Such a species is, of course, within the scope of this invention. The polyvinyl ester is the ester of a $C_1$ to $C_3$ carboxylic acid. Included among those polyvinyl acetals which may be employed in this invention may be listed the reaction products of polyvinyl alcohol with formaldehyde (polyvinyl formal), acetaldehyde, propionaldehyde, butyraldehyde (polyvinyl butyral), pentanal, methyl pentanals, hexanal, cyclohexanecarbaldehyde and benzaldehyde. Polyvinyl formal and polyvinyl butyral have the advantage of being readily available on a commercial scale.

The polyvinyl acetal employed in the practice of this invention may have a vinyl alcohol content of from about 5 to about 30 weight percent and a residual acetate content of less than about 10 weight percent, based on the total resin weight. Especially preferred are polyvinyl acetals with a vinyl alcohol content of from about 14 to about 22% and a residual acetate content of from about 1.0 to about 5.0%. The number average molecular weight of the polyvinyl acetal may vary from about 10,000 to about 70,000 daltons with a preferred range of about 15,000 to about 50,000 daltons.

Useful isocyanates for addition to the polyvinyl acetal include vinyl isocyanates, isocyanatoalkyl acrylates and methacrylates and a variety of aralkyl monoisocyanates. Specific isocyanates include vinyl isocyanate, isopropenyl isocyanate, 2-isocyanatoethyl acrylate, 2-isocyanatoethyl methacrylate, 3-isocyanatopropyl methacrylate, 1-methyl-2-isocyanatoethyl methacrylate, 1,1-dimethyl-2-isocyanatoethyl methacrylate, 1-(1-isocyanatoethyl)-3-vinylbenzene, 1-(1-isocyanatoethyl)-4-vinylbenzene, 1-(1-isocyanato-1-methylethyl)-3-(1-methylethenyl) benzene and 1-(1-isocyanato-1-methylethyl)-4-(1-methylethenyl) benzene.

The preferred isocyanates are 2-isocyanatoethyl acrylate, 2-isocyanatoethyl methacrylate, 1-(1-isocyanato-1-methylethyl)-3-(1-methylethenyl) benzene and 1-(1-isocyanato-1-methylethyl-4-(1-methylethenyl) benzene.

The reaction of the unsaturated isocyanate with the polyvinyl acetal is conveniently carried out in an anhydrous solution in any solvent which is inert to an isocyanate such as an ester, a ketone, a cyclic ether or a chlorinated hydrocarbon to provide a resin concentration in the range of about 10 to 50 weight percent preferably about 15 to 35 weight percent, and in the presence of a suitable catalyst such as a tertiary amine for example triethylenediamine or a tin compound for example stannous octoate, dibutyltin diacetate, dibutyltin dioctoate or dibutyltin dilaurate. Advantageously, the reaction is carried out at a temperature in the range of about 20 to 150° C., the selection of the reaction temperature being dependent on the reactivity of the isocyanate. For example when 2-isocyanatoethyl methacrylate is the isocyanate used for reaction with the polyvinyl acetal, the temperature is preferably in the range of about 20° to 50° C., while for 1(1-isocyanato-1-methylethyl)-3-(1-methylethenyl)benzene, the temperature is preferably in the range of about 100° to 150° C. The solution of the reaction product can provide the coating composition of the present invention. Alternatively, the unsaturated carbamate can be obtained by stripping the reaction solvent and it may then be dissolved in a solvent such as an alcohol whose presence is prohibited at the isocyanate reaction stage.

While stoichiometric quantities of isocyanate and polyvinyl acetal can be used in the reaction, it is generally advantageous to use no more than about 98 percent of the stoichiometric quantity of isocyanate to ensure that essentially no unreacted isocyanate remains in the ethylenically unsaturated carbamate product. Advantageously sufficient isocyanate is used to react with from 10 to 100 percent of the alcohol groups of the polyvinyl acetal and preferably sufficient to react with 50 to 90 percent of the alcohol groups. Properties of the ethylenically unsaturated carbamates can be modified by reacting a portion of the hydroxyl groups of the polyvinyl acetal with other reagents to increase such properties as hardness, flexibility and solvent resistance.

The curable compositions of the present invention comprise a $\beta,\gamma$-ethylenically unsaturated co-reactant in which at least one hydrogen atom is alpha and at least one ethylene double bond is $\beta,\gamma$ to an activating group such as an ether oxygen, a thioether sulfur or an amino nitrogen. Such $\beta,\gamma$-ethylenically unsaturated groups are referred to herein as allylic groups. Such co-reactants advantageously have an unsaturation equivalency of less than about 300 daltons, a number average molecular weight of less than about 10,000 daltons and from 1 to 60 allylic groups per molecule. Preferably the molecular weight is in the range of about 200 to about 4000 daltons and the number of allylic groups per molecule is at least 2 and is preferably four or more. Representative of the allylic group is the allyloxy group ($CH_2$=CH—$CH_2$—O).

Exemplary of compounds useful in the curable compositions of the present invention are triallyl isocyanurate, hexallyl melamine, hexa(allyloxymethyl) melamine; diethylene glycol bis(allyl carbonate); allyl ethers prepared by the ionic polymerization of allyl glycidyl ether; allyloxy compounds prepared from the ionic polymerization of monomers containing allylic groups and $\alpha,\beta$-ethylenically unsaturated groups such as allyl (meth)-acrylates, allyloxyethyl (meth)-acrylates, allyloxyethyl (meth)-acrylamides, and allyl vinyl ethers; cyclopentenyl cyclohexenyl and dicyclopentenyl compounds containing one or more ethylenically unsaturated groups per molecule $\beta,\gamma$ to an activating group; poly(2-buten-1,4-diol) and 2,5-poly(2,5-dihydropyran).

Preferred compounds may be selected from the group of polyethers and polyesters represented by the structural formulae:

where $R_2$ is a radical of molecular weight less than about 15,000 daltons obtained by removal of active hydrogen from an active hydrogen compound selected from the group consisting of water, alcohols, thiols, carboxylic acids, carboxylic amides and amines, where the functionality of $R_2$ is n and is in the range of 1 to 10, where E is a divalent radical selected from the group represented by the formulae

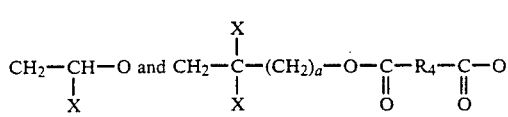

where the X groups are independently selected from the group consisting of H, $CH_3$, $C_2H_5$ and $CH_2OCH_2Y$, Y being selected from the group consisting of CH=$CH_2$, $CH_3$—C=$CH_2$, and $C_2H_5$—C=$CH_2$, where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 2 and not more than about 60. Polyethers containing an allyloxy group may be prepared by ionic polymerization of allyl glycidyl ether and an alkylene oxide and polyesters containing an allyloxy group may be prepared by polymerization of a suitable dicarboxylic acid and the monoallyl ether of glycerol. Suitable polyesters may also be prepared by substituting for the monoallyl ether of glycerol, the corresponding mono-ethers of trimethylolethane, trimethylolpropane, pentaerythritol, the diallyl ether of pentaerythritol and similar mono and polyethers of other polyols.

Another group of preferred allyloxy compounds is represented by the structural formula:

$R_5(OCH_2Y)_p$ where $R_5$ is a $C_2$ to $C_{12}$ aliphatic hydrocarbyl or oxahydrocarbyl radical of equivalence p in the range of 2 to 12 and Y is a group as defined hereinabove. Such compounds include tetrallyl pentaerythritol, hexaallyl dipentaerythritol, hexallyl sorbitol, hexamethallyl mannitol, tetraallyl-$\beta$-methyl glucoside, and decaallyl sucrose.

Yet another group of preferred allyloxy compounds are acetals derived from allyl alcohol or methallyl alcohol and aldehydes and those derived from a polyol and an acrolein compound represented by the structural formulas:

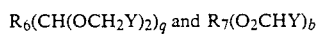

where $R_6$ is absent or is a $C_1$ to $C_{20}$ unsubstituted or substituted hydrocarbyl group, Y is a group as defined hereinabove and q is in the range of 2 to about 30; and where $R_7$ is a radical of molecular weight less than about 10,000 daltons obtained by the formal removal of 2b hydroxy groups from a polyol and b is in the range of about 2 to about 60. Such compounds include 1,1,2,2-tetrakis(allyloxy)ethane, 1,1,6,6-tetrakis(allyloxy) hexane and those derived from acrolein, methacrolein or crotonaldehyde and a polyol and those derived from polyacrolein and acrolein copolymers. Exemplary are triallylidine sorbitol and the polyacrolein acetal of polyvinyl alcohol.

The more preferred allylic compounds are the polyether and polyacetal compounds in which the number of allyloxy groups per average molecule is in the range of 2 to 40 and the allyloxy equivalent is less than about 250 daltons. Most preferably the allyloxy equivalent is less than about 150 daltons.

The curable compositions of this invention can, but do not have to be, formulated with polymerizable $\alpha,\beta$-ethylenically unsaturated modifying monomers to enhance the cure rate and the properties of the coatings, e.g., hardness, flexibility, and adhesion. Such monomers may also be used as reactive diluents. Suitable ethylenically unsaturated monomers which can be used are essentially non-volatile ethylenically unsaturated esters and amides. The term "essentially non-volatile" connotes a substance of vapor pressure less than about 130 Pa at 20° C. Monomers which can be included in the coating composition, are advantageously of number average molecular weight less than about 4000 daltons, and unsaturation equivalent weight of less than about 1000 daltons and contain at least about 2 ethylenically unsaturated groups per molecule. Such monomers include maleic and fumaric polyesters formed by reaction of maleic anhydride or acid or fumaric acid with polyol and include (meth)-acrylic esters and amides. Typical (meth)-acrylic esters and amides are represented by the formula

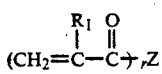

where $R_1$ is selected from the group consisting of H and $CH_3$, r is an integer in the range of 1 to 10, preferably in the range of 2 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, where Z is of a number average molecular weight less than about 4000 daltons containing a hydrocarbon, ester, amide, ether, urethane or amino resin backbone. Such monomers may be obtained by reaction of acryloyl or methacryloyl chloride with an alcohol, a polyol, an amine, or a polyamine or by the reaction of acrylic acid, methacrylic acid, acrylamide or methacrylamide with an epoxide, a polyepoxide, an isocyanate, or a polyisocyanate, or by reaction of a hydroxyalkyl acrylate or methacrylate with a carboxylic acid, polycarboxylic acid, an epoxide, a polyepoxide, an isocyanate, a polyisocyanate, a methylol amino resin, a polymethylol amino resin, a methoxymethyl amino resin or a polymethoxymethyl amino resin. Such (meth)-acryloyl compositions include isobornyl acrylate, 1,3-butylene glycol diacrylate, 1,6-hexanediol diacrylate, the polyacrylates and polymethacrylates of polyethyleneoxy diols and polyols, polypropyleneoxy diols and polyols and poly(tetramethyleneoxy) diols and polyols of molecular weight in the range of 100 to 4000 daltons, pentaerythritol tetraacrylate, trimethylolpropane triacrylate, dipentaerythritol monohydroxypentaacrylate, ethoxylated bisphenol A dimethacrylate, the diacrylates and dimethacrylates of epoxy compounds formed from bisphenol A and epichlorohydrin of molecular weight in the range of 200 to 4000 daltons, the polyacryloyl monomers prepared by reacting isocyanate capped polyethers and isocyanate capped polyesters of molecular weight up to 4000 daltons with hydroxyethyl (meth)-acrylate, and the polyacryloyl monomers prepared by reacting (meth)-acrylic acid, (meth)-acrylamide or hydroxyethyl (meth)-acrylate with polymethoxyalkyl amino resins such as hexamethoxymethyl melamine.

The compositions of the present invention are used to provide protective or decorative coatings to substrates and are capable of cure by hydroperoxides formed upon absorption of oxygen from the air in similar fashion to the conventional method of curing air-drying alkyds. When the coating composition of the present invention is applied to a substrate, reaction of the components of the coating composition is effected under air-dry conditions or by application of heat to provide a cured composition. Generally such reaction requires a free-radical initiator for thermal cure and a free-radical initiator and a metal drier for air-dry cure. Examples of free-radical polymerization initiators include tert-butyl hydroperoxide, methyl ethyl ketone peroxide, cumene peroxide, benzoyl peroxide, lauroyl peroxide, 2,5-dihydroperoxy-2,5-dimethylhexane, azo-bis(isobutyronitrile) and the like and mixtures thereof. Also suitable are oxidized versions of the allylic co-reactant which may be prepared by exposing the allylic co-reactant to air or oxygen until the desired initiating activity is obtained. Suitable metal driers to catalyze the free-radical curing process under air-drying conditions are any of those conventionally used for air-drying of coatings, including the salts and soluble complexes of transition elements such as cobalt and manganese. Typical representatives include cobaltous acetate, citrate, acetylacetonate and 2-ethylhexanoate, and the corresponding soluble manganous salts and complexes. Generally salts generate higher reaction rates. The metallic drier is usually added in the form of a solution in a suitable solvent that will ensure dispersion of drier throughout the coating composition and can be added in formulation of the coating composition with the $\alpha,\beta$-ethylenically unsaturated co-reactant or separately during or after application of the composition to the substrate. The concentration range of metallic drier is generally in the range of 0.001 to 1.0% by weight of the coating composition.

The proportions of the ingredients can vary widely depending on the compatibility of the major ingredients, namely the unsaturated carbamate of the polyvinyl acetal, the $\beta,\gamma$-ethylenically unsaturated or allylic compound and the $\alpha,\beta$-ethylenically unsaturated compound, and the nature of the coating to be obtained. The major ingredients are advantageously selected to be compatible with one another, to provide an effective amount of the allylic unsaturated compound, i.e., an amount sufficient to provide an increase in the rate of cure of the coating over that under the same conditions without its presence, to provide an adequate degree of hardness in the uncured coating to allow sanding and buffing without blinding the sand paper, and to avoid impairment of gloss and clarity of the cured coatings. Compatibility is readily determined by mixing the major ingredients and determining the range of mixtures which do not form cloudy solutions or coatings or separate into phases. Provided that the major ingredients are suitably compatible and provided that the dry uncured coating composition is sufficiently hard for its intended purpose, the weight range of the unsaturated carbamate of the polyvinyl acetal can be from about 40 to about 90 percent, the weight range of the $\beta,\gamma$-ethylenically unsaturated co-reactant can be from about 30 to about 4 percent and the weight range of the $\alpha,\beta$-ethylenically unsaturated co-reactant can be from about 56 to about 0 percent all percentages being based on the total weight of the unsaturated carbamate of the polyvinyl acetal, the $\beta,\gamma$-ethylenically unsaturated co-reactant and the $\beta,\gamma$-ethylenically unsaturated co-reactant. The preferred ranges are about 50 to about 80 percent, about 25 to about 10 percent and about 45 to about 10 percent respectively.

The concentration of free-radical initiator in the total weight of unsaturated reactants and initiator can vary from about 1 to about 100 meq. per 100 g. and preferably from about 5 to about 30 meq. per 100 g. to provide an adequate rate of cure without excessive generation of by-products.

Curing of the coating composition after it has been deposited on the substrate can be carried out at temperatures of 250° C. or lower. Though the cure rate will usually increase as the temperature increases the preferred cure temperature for low energy curing is 10° C. to 60° C. and the initiator and metal drier and their concentrations are selected to be effective in this temperature range.

The coating compositions of the present invention comprising the ethylenically unsaturated carbamate of the polyvinyl acetal, the β,γ-ethylenically unsaturated co-reactant, the α,β-ethylenically unsaturated co-reactant and the initiator and when required, the metal drier are generally prepared by mixing the ingredients in the desired proportions with a solvent. The solvent used is generally the solvent in which the ethylenically unsaturated carbamate is prepared, e.g., a ketone, an ester or an aromatic hydrocarbon. The composition is applied to a suitable substrate such as wood, plastic, metal, ceramic and the like by spraying, dipping, brushing, curtain coating and the like. After coating the solvent is allowed to evaporate, aided by heat or forced air if necessary, until the coating is tack free. At this stage the coating can be repaired for example by removal with solvent and recoating, or by sanding, buffing and polishing. This intermediate stage is then cured to achieve solvent and abrasion resistance by allowing the coating to air dry over an extended period of time, or by heating or forced drying. Curing can be accelerated by carrying it out in an oxygen deficient atmosphere.

The order of mixing of the components of the coating composition is not critical so long as the initiator and optionally, metal drier are supplied in effective concentrations. Because of the limited pot-life of the mixture when the initiator is added, it can be convenient to supply the components in appropriate streams continuously in the desired weight ratio to a mixer-applicator or spray gun and thereafter to apply or spray the mixed coating composition onto the substrate.

When a metal drier catalyst is included in the coating composition, latency can be conferred on the catalyst by introducing a volatile or fugitive acid such as trifluoroacetic acid, glycolic acid or 1,1,1-trifluoro-2,4-pentanedione in a ratio of 1 to 10 moles per mole of metal drier. By this method potlife can be enhanced from hours to days. The compositions of the invention can also include (besides the monomers, oligomers, and resins mentioned above), a variety of additives utilized for their known purposes, such as stabilizers, inhibitors, lubricants, flexibilizers, pigments, dyes, and fillers such as finely divided silica, diatomaceous earth, metal oxides, fiberglass, glass bubbles, and talc. Fillers can generally be used in proportions up to about 200 percent by weight of the curable composition but preferably are used up to about 50 percent by weight.

The following examples are set forth to illustrate the invention but are not meant to limit it. Parts and percentages are by weight unless otherwise indicated.

Preparation of Ethylenically Unsaturated Carbamates of Polyvinyl Acetals

Example 1

1000 parts by weight of a polyvinyl butyral of number average molecular weight 20,000 comprising 87 weight percent vinyl butyral units, 12 weight percent vinyl alcohol units and 1 weight percent vinyl acetate units (sold by Monsanto Company under the registered trademark Butvar B-79) and 1.08 parts of 2,6-di-t-butyl-4-methyl phenol are dissolved in 5000 parts by weight of refluxing methyl isobutyl ketone, and then 1200 parts by weight of the ketone is distilled removing any water azeotrofically The solution is cooled to about 25° C. Dibutyltin diacetate (8.71 parts by weight) is added as a 10% solution in toluene and stirred in. 307 parts by weight of 2-isocyanatoethyl methacrylate hereinafter referred to as IEM (0.81 equivalent to 1 equivalent of polyvinyl butyral) is added at a steady rate over a period of 2 hours to the stirred solution of polyvinyl butyral. After 5 hours, infrared analysis showed that the isocyanate has completely reacted. The resin solids content is 24.8% and its viscosity is 300 cps. The unsaturation equivalent weight of the unsaturated carbamate is 644.

Example 2

Example 1 is repeated using a polyvinyl butyral of number average molecular weight 15,000, comprising 80 weight percent vinyl butyral units, 19 weight percent vinyl alcohol units and 1 weight percent vinyl acetate units (sold by Monsanto under the registered trademark Butvar B-98). 0.64 equivalents of IEM is reacted with 1 equivalent of the polyvinyl butyral. The resin solids content of the final solution is 25.5 percent and the viscosity is 400 cps. The unsaturated equivalent of the carbamate is 517.

Example 3

Example 1 is repeated using a polyvinyl formal of number average molecular weight 15,900 comprising 82 weight percent vinyl formal units, 6 weight percent vinyl alcohol unit,, and 12 weight percent vinyl acetate units, (sold by Monsanto under the registered trademark Formvar 5/95E). 0.9 equivalent of IEM is reacted with 1 equivalent of the polyvinyl formal in ethylene dichloride solution. The resin solids content of the final solution is about 25 percent and the unsaturation equivalent is about 870.

Example 4

500 parts by weight of the polyvinyl butyral of Example 2 and 0.5 parts by weight of 2,6-di-t-butyl-4-methylphenol are dissolved in 2800 parts of refluxing methyl isobutyl ketone. 500 parts of the ketone are distilled removing water azeotropically, and the solution is cooled. 445 parts of tetrahydrofuran are added when the temperature reaches 48° C. At 42° C., 4.35 parts of a 10% solution of dibutyltin diacetate in toluene is added. At 33° C., 300 parts of 1-(1-isocyanato-1-methylethyl)-3-(1-methylethenyl) benzene hereinafter IMB, (equivalent to 69 percent of the hydroxy groups of the polyvinyl butyral) is added and the solution is maintained at 25° C. for 5 days. Infrared analysis shows that consumption of the isocyanate is complete. The resin solids content of the final solution is 22.5 percent and the viscosity is 300 cps. The unsaturation equivalent of the carbamate resin is 537.

Example 5

Example 4 is repeated with 0.61 equivalents of IMB to 1 equivalent of the polyvinyl butyral. The isocyanate is added to the solution at 50° C. and the solution is maintained at this temperature for five hours and then it is allowed to cool to ambient temperature and maintained at ambient temperature for 16 hours. Infrared analysis shows almost complete consumption of isocyanate. The solution is then reacted with 0.39 equivalents of IEM to 1 equivalent of polyvinylbutyral. After 3 days, infrared analysis showed that consumption of the isocyanate is complete. The resin solids content of the solution is 24.6%. The viscosity is 300 cps. The unsaturation equivalent of the unsaturated carbamate product is 415.

Evaluation of Coating Compositions

Example 6

A coating composition is prepared by mixing 80 parts of the unsaturated carbamate of Example 4 with 20 parts of a poly(allyl glycidyl ether) sold by Monsanto Company under the registered trademark Santolink Xl-100, of molecular weight 1200 and unsaturation equivalent 116, prepared by cationic polymerization of allyl glycidyl ether using ethylene glycol as the initiator species, 0.5 parts of 2,5-dihydroperoxy-2,5-dimethylhexane, and 0.04 part cobalt supplied as potassium cobalt naphthenate sold by Nuodex, Inc. under the registered trademark Nuocure CK. The pot-life is 6 days. The coating composition is applied to glass plates to give a dry film of 1.5 mils. The film is sandable after five minutes when it reaches the tack free state. Under ambient cure conditions, it achieves a Tukon hardness of 4 after 1 day and 10 after 7 days. Its solvent resistance increases from 160 MEK double rubs after 1 day to 290 MEK double rubs after 7 days. When the dry film is cured for 30 minutes at 65° C., the Tukon hardness is 5 after 1 day and 10 after 7 days. The solvent resistance is 140 MEK double rubs after 1 day, increasing to 290 after 7 days.

Example 7

Example 6 is repeated with the following coating composition.
60 parts of the unsaturated carbamate of Example 4 (22.5% in methyl isobutyl ketone).
15 parts of the poly(allyl glycidyl ether) of Example 6.
25 parts of an acrylated epoxy resin sold by Celanese under the tradename RDX-80945.
0.5 part 2,5-dihydroperoxy-2,5-dimethylhexane (DHDMH).
0.04 part Co supplied as Nuocure CK.

The pot-life of the composition is less than 1 day. The tack free time is 10 minutes. Under ambient cure conditions, the Tukon hardness increases from 3 after one day to 12 after 7 days. The solvent resistance is 300+ MEK double rubs after 1 day. When the coating is cured for 30 minutes at 65° C., the Tukon hardness is 8 after 1 day increasing to 12 after days under ambient conditions and the solvent resistance is 300+ MEK double rubs.

Evaluation of Coating Compositions

Example 8

A coating composition is prepared by mixing parts of the unsaturated carbamate of polyvinyl butyral of Example 5 with 20 parts of a poly(allyl glycidyl ether) sold by Monsanto Company under the registered trademark Santolink Xl-100, of molecular weight 1200 and unsaturation equivalent 116, prepared by cationic polymerization of allyl glycidyl ether using ethylene glycol as the initiator species, 0.5 parts of 2,5-dihydroperoxy-2,5-dimethylhexane, and 0.04 part cobalt as potassium cobalt naphthenate sold by Nuodex, Inc. under the registered trademark Nuocure CK. The pot-life is less than one day. The coating composition is applied to glass plates to give a dry film of 1.5 mils. The film is sandable after six minutes when it reaches the tack free state. Under ambient cure conditions, it achieves a Tukon hardness of 13 after 7 days. Its solvent resistance increases from 100 MEK double rubs after 4 days to 160 MEK double rubs after 7 days. When the dry film is cured for 30 minutes at 65° C., the Tukon hardness is 15 after 7 days and the solvent resistance is 110 MEK double rubs after one day increasing to 300+ after 7 days.

Example 9

Example 8 is repeated with the following coating composition.
55 parts of the unsaturated carbamate of Example 5 (25% in methyl isobutyl ketone).
20 parts of the poly(allyl glycidyl ether) of Example 6.
25 parts of an acrylated epoxy resin sold by Celanese under the tradename RDX-80945.
0.5 part 2,5-dihydroperoxy-2,5-dimethylhexane (DHDMH).
0.04 part Co supplied as Nuocure CK.

The pot-life of the composition is less than 1 day. The tack free time is 11 minutes. Under ambient cure conditions, the Tukon hardness is 12 after 7 days and the solvent resistance is 300+. When the coating is cured for 30 minutes at 65° C., the Tukon hardness is 14 after 7 days under ambient conditions and the solvent resistance is 300+ MEK double rubs after one day.

What is claimed is:

1. An air-dry coating composition comprising (a) an ethylenically unsaturated carbamate derived from a polyvinyl acetal of number average molecular weight in the range of about 10,000 to about 70,000 daltons and an ethylenically unsaturated isocyanate selected from the group consisting of 1-(1-isocyanatoethyl)-3-vinylbenzene, 1-(1-isocyanatoethyl)-4-vinylbenzene, 1-(1-isocyanato-1-methylethyl)-3-(1-methylethenyl)benzene and 1-(1-isocyanato-1-methylethyl)-4-(1-methylethenyl)benzene and (b) a β,γ-ethylenically unsaturated coreactant selected from the group represented by the formulae:

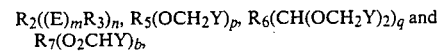

where $R_2$ is a radical of molecular weight less than about 15,000 daltons obtained by removal of active hydrogen from an active hydrogen compound selected from the group consisting of water, alcohols, thiols, carboxylic acids, carboxylic amides and amines, where the functionality of $R_2$ is n and is in the range of 1 to 10, where E is a divalent radical selected from the group represented by the formulae

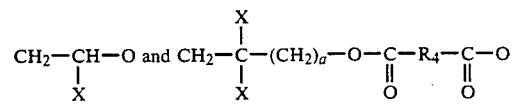

where X is selected from the group consisting of H, $CH_3$, $C_2H_5$ and $CH_2OCH_2Y$, Y being selected from the group consisting of

where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 2 and not more than about 60; where $R_5$ is a $C_2$ to $C_{12}$ aliphatic hydrocarbyl or oxahydrocarbyl radical of equivalence p in the range of 2 to 12; where $R_6$ is absent or is a $C_1$ to $C_{20}$ unsubstituted or substituted hydrocarbyl group and q is in the range of 2 to about 30;

where $R_7$ is a radical of molecular weight less than about 10,000 daltons obtained by removal of 2b hydrogens from a polyol and b is in the range of about 2 to about 60; and wherein the allyloxy compound contains from 2 to 60 allyloxy groups per molecule.

2. The coating composition of claim 1 wherein the poly(vinyl acetal) is the reaction product of a polyvinyl alcohol and $C_1$ to $C_7$ aldehyde, has a vinyl acetal content in the range of about 60 to about 95 weight percent, a vinyl alcohol content in the range of about 5 to about 30 weight percent and a vinyl ester content in the range of about 0 to about 10 weight percent, and wherein the vinyl ester is the ester of a $C_1$ to $C_3$ carboxylic acid.

3. The coating composition of claim 2 wherein the aldehyde is formaldehyde or butyraldehyde, wherein the vinyl acetal content is in the range of about 73 to about 85 weight percent, wherein the vinyl alcohol content is in the range of about 14 to about 22 weight percent, wherein the vinyl ester is vinyl acetate in the range of about 1 to about 5 weight percent and wherein the number average molecular weight is in the range of about 15,000 to about 50,000 daltons.

4. The coating composition of claim 1 wherein the isocyanate is 1-(1-isocyanato-1-methylethyl)-3-(1-methylethenyl)benzene.

5. The coating composition of claim 2 wherein from 10 to 100 percent of the hydroxy groups of the polyvinyl acetal have been reached with the isocyanate.

6. The coating composition of claim 5 wherein 50 to 90 percent of the hydroxy groups of the polyvinyl acetal have been reacted with the isocyanate.

7. The coating composition of claim 1 additionally comprising an $\alpha,\beta$-ethylenically unsaturated co-reactant.

8. The coating composition of claim 7 wherein the $\alpha,\beta$-ethylenically unsaturated co-reactant has an unsaturation equivalent weight of less than 1000 daltons and is a maleic or fumaric ester or a (meth)-acrylic ester or amide containing at least about 2 $\alpha,\beta$-ethylenically unsaturated groups per molecule.

9. The coating composition of claim 8 wherein the (meth)-acrylic ester or amide is represented by the formula

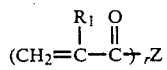

where $R_1$ is selected from the group consisting of H and $CH_3$ where r is an integer in the range of 1 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, where Z is of a number average molecular weight less than about 4000 daltons containing a hydrocarbon, ester, amide, ether, urethane or amino resin backbone.

10. The coating composition of claim 7 wherein the poly(vinyl acetal) is the reaction product of a polyvinyl alcohol and $C_1$ to $C_7$ aldehyde, has a vinyl acetal content in the range of about 60 to about 95 weight percent, a vinyl alcohol content in the range of about 5 to about 30 weight percent and a vinyl ester content in the range of about 0 to about 10 weight percent and has a number average molecular weight in the range of about 10,000 to about 70,000 daltons, and wherein the vinyl ester is the ester of a $C_1$ to $C_3$ carboxylic acid; wherein the isocyanate is selected from the group consisting of 1-(1-isocyanatoethyl)-3-vinyl-benzene, 1-(1-isocyanatoethyl)-4-vinylbenzene, 1-(1-isocyanato-1-methylethyl)-3-(1-methylethenyl) benzene and 1-(1-isocyanato-1-methylethyl)-4-(1-methylethenyl) benzene; wherein the $\alpha,\beta$-ethylenically unsaturated co-reactant has an unsaturation equivalent weight of less than 1000 daltons and is a maleic or fumaric ester or a (meth)-acrylic ester or amide containing at least about 2 $\alpha,\beta$-ethylenically unsaturated groups per molecule.

11. The coating composition of claim 10 wherein the aldehyde is formaldehyde or butyraldehyde, wherein the vinyl acetal content is in the range of about 73 to about 85 weight percent, wherein the vinyl alcohol content is in the range of about 14 to about 22 weight percent, wherein the vinyl ester is vinyl acetate in the range of about 1 to about 5 weight percent and wherein the number average molecular weight is in the range of about 15,000 to about 50,000 daltons.

12. The coating composition of claim 11 wherein the (meth)-acrylic ester or amide is represented by the formula

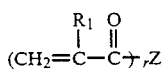

where $R_1$ is selected from the group consisting of H and $CH_3$ where r is an integer in the range of 1 to 10, and Z is a saturated or ethylenically unsaturated residue of an alcohol or polyol, an amine or a polyamine, an epoxide or polyepoxide, an isocyanate or polyisocyanate, a methylol amino resin or polymethylol amino resin, where Z is of a number average molecular weight less than about 4000 daltons containing a hydrocarbon, ester, amide, ether, urethane or amino resin backbone.

13. A substrate coated with the coating composition of claim 1.

14. A substrate coated with the coating composition of claim 3.

15. A substrate coated with the coating composition of claim 6.

16. A substrate coated with the coating composition of claim 7.

17. A substrate coated with the coating composition of claim 9.

18. A substrate coated with the coating composition of claim 10.

19. A substrate coated with the coating composition of claim 12.

20. A substrate coated with the cured coating composition of claim 1.

21. A substrate coated with the cured coating composition of claim 3.

22. A substrate coated with the cured coating composition of claim 6.

23. A substrate coated with the cured coating composition of claim 7.

24. A substrate coated with the cured coating composition of claim 9.

25. A substrate coated with the cured coating composition of claim 10.

26. A substrate coated with the cured coating composition of claim 12.

* * * * *